US012619504B2

(12) United States Patent
Madan et al.

(10) Patent No.: US 12,619,504 B2
(45) Date of Patent: May 5, 2026

(54) OPPORTUNISTIC SETTING OF RELATIONSHIPS WHEN CLONING FILES ACROSS NAMESPACES IN A DEDUPLICATION FILESYSTEM

(71) Applicant: Dell Products L.P., Round Rock, TX (US)

(72) Inventors: Nitin Madan, Cupertino, CA (US); Salil Dangi, Mission Viejo, CA (US); Alok Katiyar, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/789,696

(22) Filed: Jul. 31, 2024

(65) Prior Publication Data

US 2026/0037389 A1      Feb. 5, 2026

(51) Int. Cl.
*G06F 11/00*        (2006.01)
*G06F 11/1446*      (2026.01)
*G06F 16/13*        (2019.01)

(52) U.S. Cl.
CPC ...... *G06F 11/1466* (2013.01); *G06F 11/1453* (2013.01); *G06F 16/137* (2019.01)

(58) Field of Classification Search
CPC . G06F 11/1466; G06F 16/137; G06F 11/1453
See application file for complete search history.

(56) References Cited

U.S. PATENT DOCUMENTS

| | | | | |
|---|---|---|---|---|
| 2011/0185253 A1* | 7/2011 | Resch | ................. | G06F 11/1076 |
| | | | | 714/755 |
| 2016/0292047 A1* | 10/2016 | Bender | ............... | G06F 11/1435 |
| 2023/0350765 A1* | 11/2023 | Madan | ............... | H04L 67/1097 |

* cited by examiner

*Primary Examiner* — Jason B Bryan
(74) *Attorney, Agent, or Firm* — Staniford Tomita LLP

(57) ABSTRACT

Enhancing data replication performance optimization by maintaining parent-child file relationships when cloning an entire or portion of a first namespace to a second namespace for backups cloned across namespaces in a deduplication filesystem. The file copies may be made by either virtual synthetic (VS) copies that keep a one-way relationship between parent-child files or fast copy overwrite (FCOW) copies that keep a two-way parent-child relationship. Extended attributes are used as metadata for the files to indicate a path or recipe to generate the child file. The extended attributes for the cloned parent and child files are fixed to reference the second namespace so that a relative relationship between the parent and child files is maintained after cloning to the second namespace.

18 Claims, 17 Drawing Sheets

100

STORAGE/BACKUP
MANAGEMENT
PROCESS
112

Fastcopy/Clone
Process
111

File Relationship
Fixing Process
120

102
Storage
Server

124

NETWORK STORAGE

114

NETWORK
110

104

VM STORAGE

108

DATA SOURCE

DATABASE
PROCESSES
116

106
DB
Server

400 file 1 (basefile)     402

404
Included Segment
from file 1

406
New
Content

408
Included Segment from file 1

New Synthesized file from file1   410

502

Base File 1   Base File 2   Base File 3

501

APIs 503

VS FILE 504

RECIPE 510

506

COPY 508

600

800

1400

1500

OPPORTUNISTIC SETTING OF RELATIONSHIPS WHEN CLONING FILES ACROSS NAMESPACES IN A DEDUPLICATION FILESYSTEM

TECHNICAL FIELD

Embodiments relate to deduplication backup systems, and specifically to opportunistically setting or repairing relationships for backups cloned across namespaces.

BACKGROUND OF THE INVENTION

Data deduplication is a form of single-instance storage that eliminates redundant copies of data to reduce storage use. Data compression methods are used to store only unique instances of data by replacing redundant data blocks with pointers to the unique copies. As new data is written, duplicate chunks are replaced with these pointer references to previously stored data. Deduplication systems support various different backup operations such as full, differential, and incremental backups. A synthetic backup is the process of generating a file from a complete copy of a file created in the past and one or more incremental copies created later, and backups may be referred to as virtual synthetic backups of these various backup types.

Backup programs use namespaces to ensure that a given set of objects have unique names so that they can be easily identified. Namespaces are commonly structured as hierarchies to allow use of names in different contexts.

Deduplication filesystems like the PowerProtect Data Domain File System (DDFS) have very efficient file cloning methods, such as the fastcopy process. A fastcopy creates a new inode (new namespace entity), which points to the same content between the original file and the copied file. It is a significant challenge, however, to maintain file relationships between the files when cloning across namespaces.

What is needed, therefore, is a process to opportunistically establish, set or repair file relationships in the context of the data cloning operations across different namespaces.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost trademarks of Dell Technologies, Inc.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

DETAILED DESCRIPTION

Figure 1:
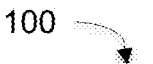
FIG. 1 is a diagram of a computing network implementing a method for enhancing data replication performance by preserving fastcopy-overwrite optimization for backups cloned across namespace subdivisions, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANS (local area networks). Thus, aspects of the one or more embodiments described herein may be implemented on one or more computers executing software instructions, and the computers may be networked in a client-server arrangement or similar distributed computer network.

Embodiments are described for a method for enhancing data replication performance by preserving opportunistically setting or repairing file relationships when cloning data across different namespace. FIG. 1 illustrates a computer network system that implements one or more embodiments of a data processing and storage network system implementing such a process, under some embodiments.

In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays, such as RAID (redundant array of individual disk) arrays. In an embodiment, system 100 may represent a Data Domain Restorer (DDR)-based deduplication storage system, and storage server 102 may be implemented as a DDR Deduplication Storage server provided by Dell Technologies, Inc. However, other similar backup and storage systems are also possible.

The Data Domain File System (DDFS) from Dell is an example deduplication filesystem in which the filesystem anchors and segments data as it is ingested. The filesystem keeps track of segments which are stored on the disk, and if the segments are accessed again, the filesystem just stores a reference to the original data segment that was written to disk. A file is therefore a stream of segments, and these segments are uniquely identified by a key/label data element, called a fingerprint. Given a file offset and length, the corresponding data segment fingerprints need to be looked up to access the actual data.

The Data Domain File System (DDFS) is an inline data deduplication filesystem. As data gets written to the filesystem, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file-system that forms segments from data, these segments are uniquely identified by their key/label called as fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A file in DDFS is represented by a Merkle tree with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers. The system can efficiently copy an existing file using an underlying Merkle tree. It creates the new file with a new name, and therefore a new $L_6$ root of the tree, but that tree then references the identical $L_P$ chunks. As this operation involves only the root of the tree, it is trivially fast and does not increase physical space in use beyond the one chunk containing the $L_6$.

A file in DDFS is represented by a Merkle tree with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

Figure 2:
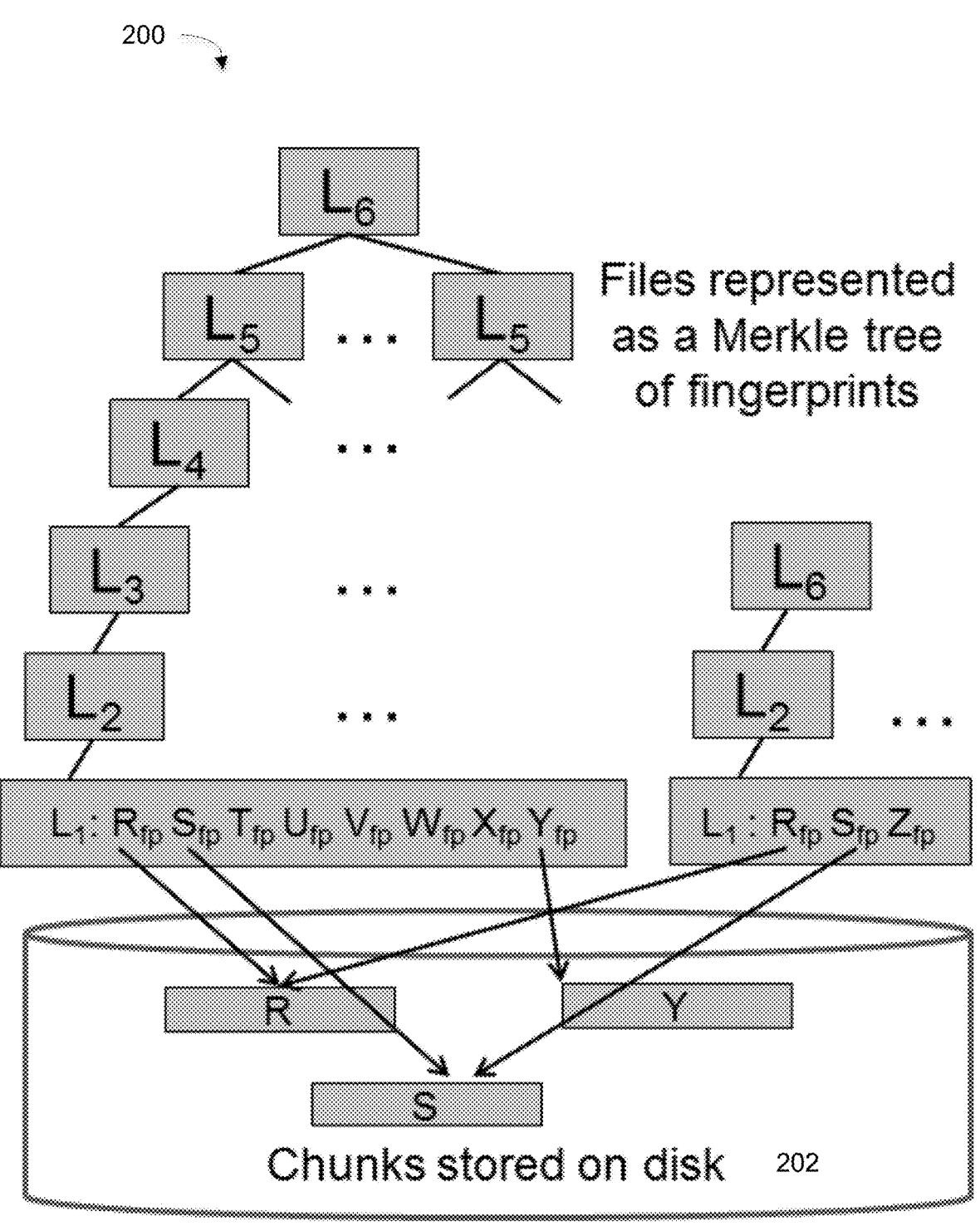
FIG. 2 illustrates files an example Merkle tree representation of files in a deduplication backup system, under some embodiments.

FIG. 2 illustrates files an example Merkle tree representation of files in a deduplication backup system, under some embodiments. As shown in FIG. 2, Merkle tree 200 comprises layers L0 to L6. The chunks directly written to disk 202 are referred to as $L_0$, meaning the lowest level of the tree. Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough not to need intermediate nodes such as the example on the right side of the figure. The $L_1$-$L_6$ chunks are referred to as $L_p$ chunks, where p is a parameter that ranges from 1 to 6 and indicates metadata representing the file. Deduplication takes place because a chunk can be referenced multiple times. The file system is a forest of Merkle trees, but these trees are not disjoint, particularly at the lowest level. In general, $L_p$ chunks are themselves stored on disk in containers, which include a relatively small (hundreds of KB) metadata section with a list of fingerprints for the chunks within the container. Thus, they may be read more quickly than the full container.

A Data Domain or similar system can efficiently copy an existing file using the same underlying Merkle tree. It creates the new file with a new name, and therefore a new $L_6$ root of the tree, but that tree then references the identical $L_P$ chunks. As this operation involves only the root of the tree, it is trivially fast and does not increase physical space in use beyond the one chunk containing the $L_6$.

Figure 3:
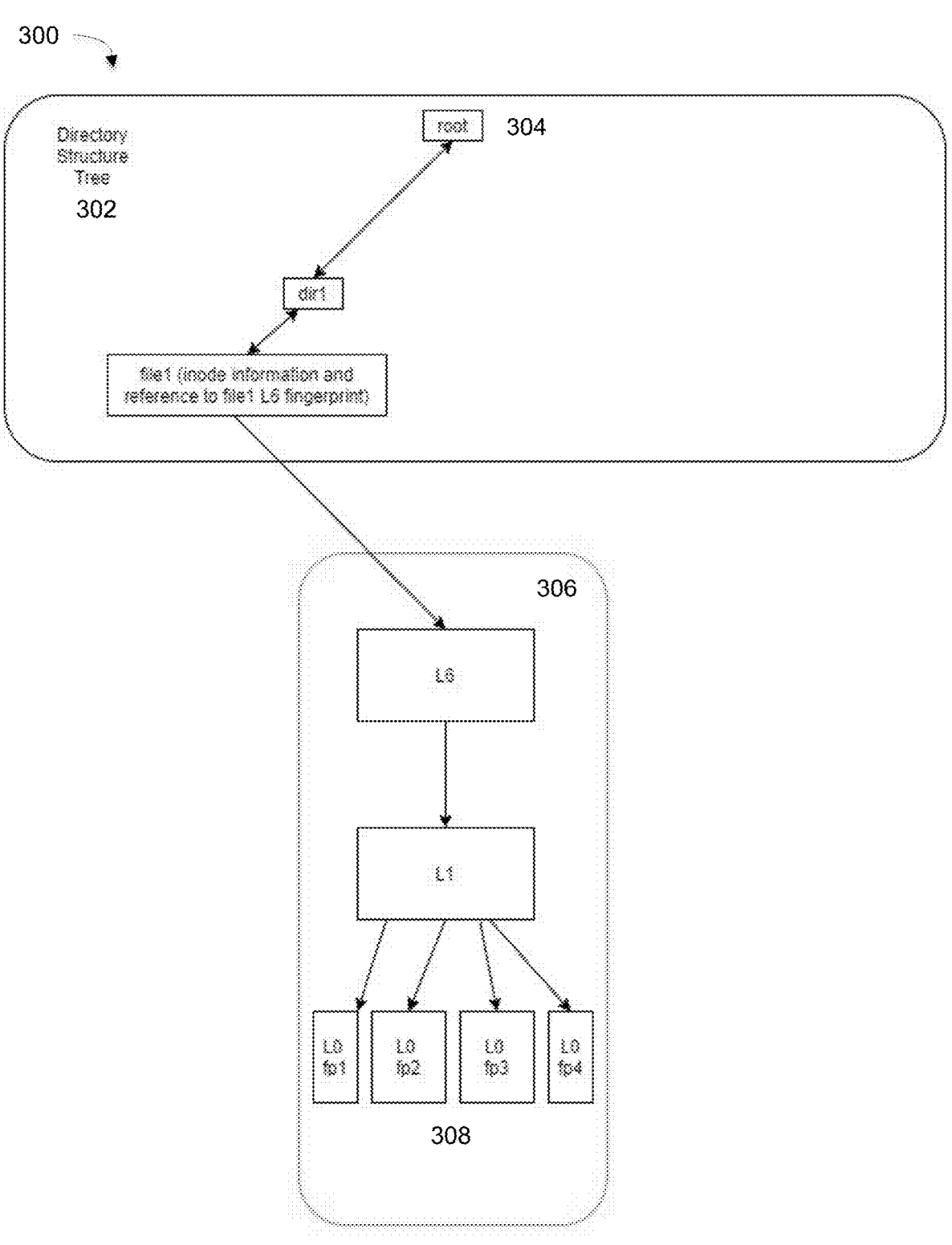
FIG. 3 illustrates a Data Domain filesystem Merkle tree accessed by a file under an example embodiment.

FIG. 3 illustrates a DDFS Merkle tree accessed by a file under an example embodiment. As shown in system 300, a directory structure tree 302 comprises a root directory 304, which accesses a directory (dir1) that holds a particular file (file1). The directory tree data for file1 comprises inode information and a reference to the file1 L6 fingerprint in the associated Merkle tree 306.

As mentioned above, the data chunks directly written to disk are referred to as $L_0$, meaning the lowest level of the tree, and which hold the respective fingerprints (fp1 to fpn). Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough to not need intermediate nodes. The $L_1$-$L_6$ chunks are referred to as Lp chunks, where p is a parameter that ranges from 1 to 6 and indicates metadata representing the file. Deduplication takes place because a chunk can be referenced multiple times. The filesystem is a forest of Merkle trees, but these trees are not disjoint, particularly at the lowest level.

Backup system 100 can implement various different backup operations, such as full backups that copy all the data from a source to a backup storage data, differential backups that backup all data that has changed from a last full backup, and incremental backups that backup only the data that has changed since a previous backup. In a virtualized environment using a hypervisor (e.g., VMware), these backups may be implemented using virtual storage and virtual full or virtual incremental backups. In addition, backups may be synthesized or implemented as synthetic backups, which involve generating a file from a complete copy of the file created in a full backup and one or more incremental copies created later.

Figure 4:
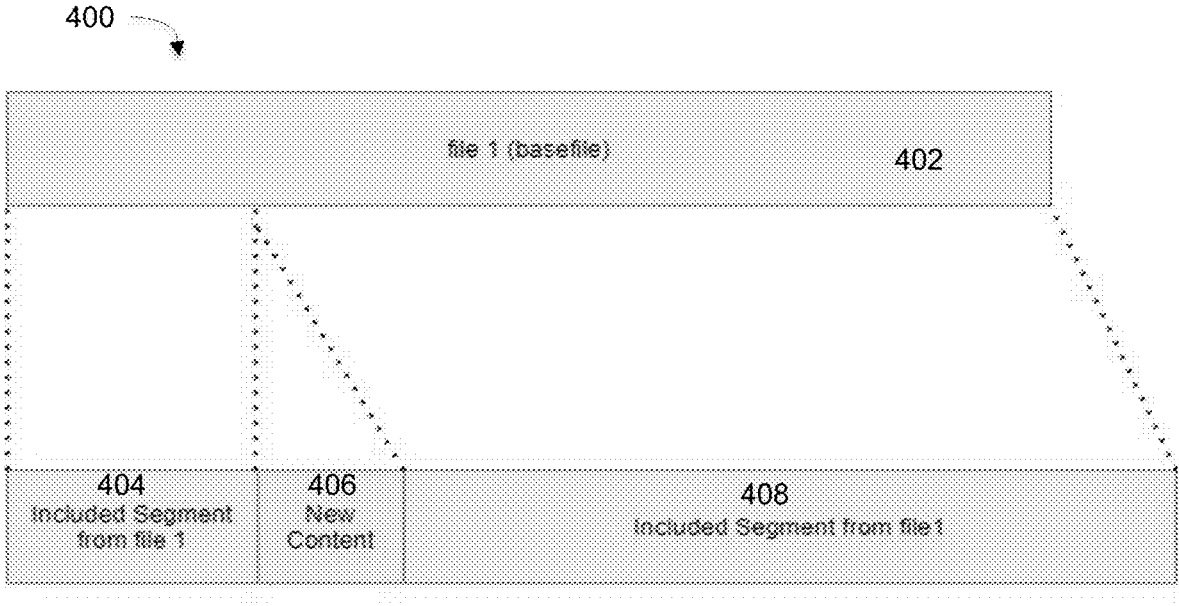
FIG. 4 illustrates the composition of a virtual synthetic backup file, under some embodiments.

A virtual synthetic process is a backup method where the incremental backup file is stitched on top the last full backup file so that the new backup file includes the portion of the incremental file and the last full backup. Traditionally, the last full backup file is called the base file, and the incremental file is called the increment. FIG. 4 illustrates the composition of a virtual synthetic backup file, under some embodiments. As shown in diagram 400 of FIG. 4, file 1 comprises a base file 402. The synthesized backup process works by incorporating (stitching in) new content 406 among or between other segments 404, 408 of the base file to generate the synthesized backup file 410.

Figure 5:
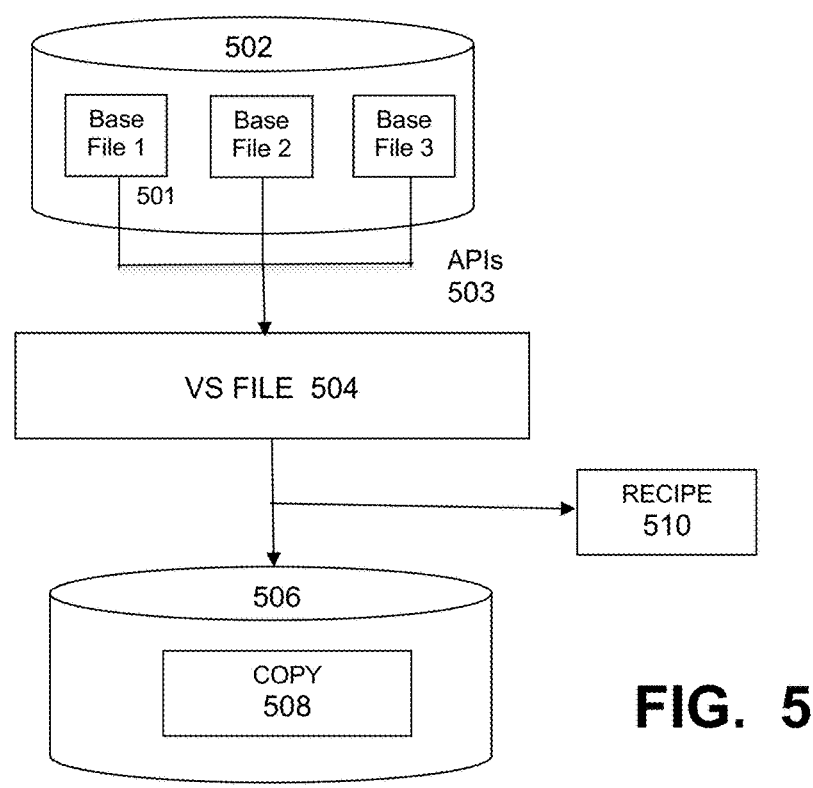
FIG. 5 illustrates generating a virtual synthetic backup file, under some embodiments.

FIG. 5 illustrates generating a virtual synthetic backup file, under some embodiments. As shown in FIG. 5, a source directory or disk 502 stores a number of base files 501 that represent prior generations of a backup. The VS file 504 is created using special APIs (synthetic APIs) 503 to include portions of prior generations of the backup. When the VS file 504 is written to the storage disk 506 and stored as a copy 508, certain metadata is created as a file recipe 510. The recipe 510 comprises a description of the relationship of the target file or copy 508 to a set of prior generations of base files 501, and basically holds information about which portions of the given files are same.

Another type of virtual synthetic workload is the Fastcopy Overwrite (FCOW) workload, which uses a copy of the last backup image, and then the segments which are changed are overwritten in place (on the copy). The FCOW is done on fixed sized segmentation environments where the segmentation would not have the IO amplification. The FCOW workload does not use the synthetic APIs, and therefore, recipes are not created for these copies.

As shown in FIG. 5, the Data Domain filesystem (and similar systems) supports virtual synthetic backups using special APIs 503 that can stitch the new file tree to copy portions (Lps) into a new Merkle tree of the VS file 504. Being a deduplication filesystem, this is optimally performed because all that is done is an operation that copies and manipulates metadata. Furthermore, as the filesystem creates the VS files from their base files, it stores the information about the VS files as metadata in the form of recipes 510. This information is used in replication, tiering and diffing, among other possible functions.

In general, a recipe by itself is information about a data extent from a certain file into the given file at the given offset in the current file. The extent is described by the offset in the source file, and the length of the extent. The destination offset is the offset where the source extent is "copied into". The virtual synthetic backup protocol is flexible in that it allows for includes from several base files instead of just one. Each of the base files referenced is kept in the base file table. The index of the base file in the base file table is used as the base file index in the recipe table.

An example recipe is shown in Table 1 below, which lists a base file index number with the file handle (as metadata).

TABLE 1

| Base file Index | File Handle/ Metadata |
| --- | --- |
| 1 | File 1 |

Additional metadata information comprises source and destination offsets and file sizes, as shown in Table 2 below.

TABLE 2

| Base file Index | Source Offset | Destination Offset | Size |
| --- | --- | --- | --- |
| 1 | 0 | 100000 | 100000 |
| 1 | 150000 | 10000000 | 9850000 |

Figure 6:
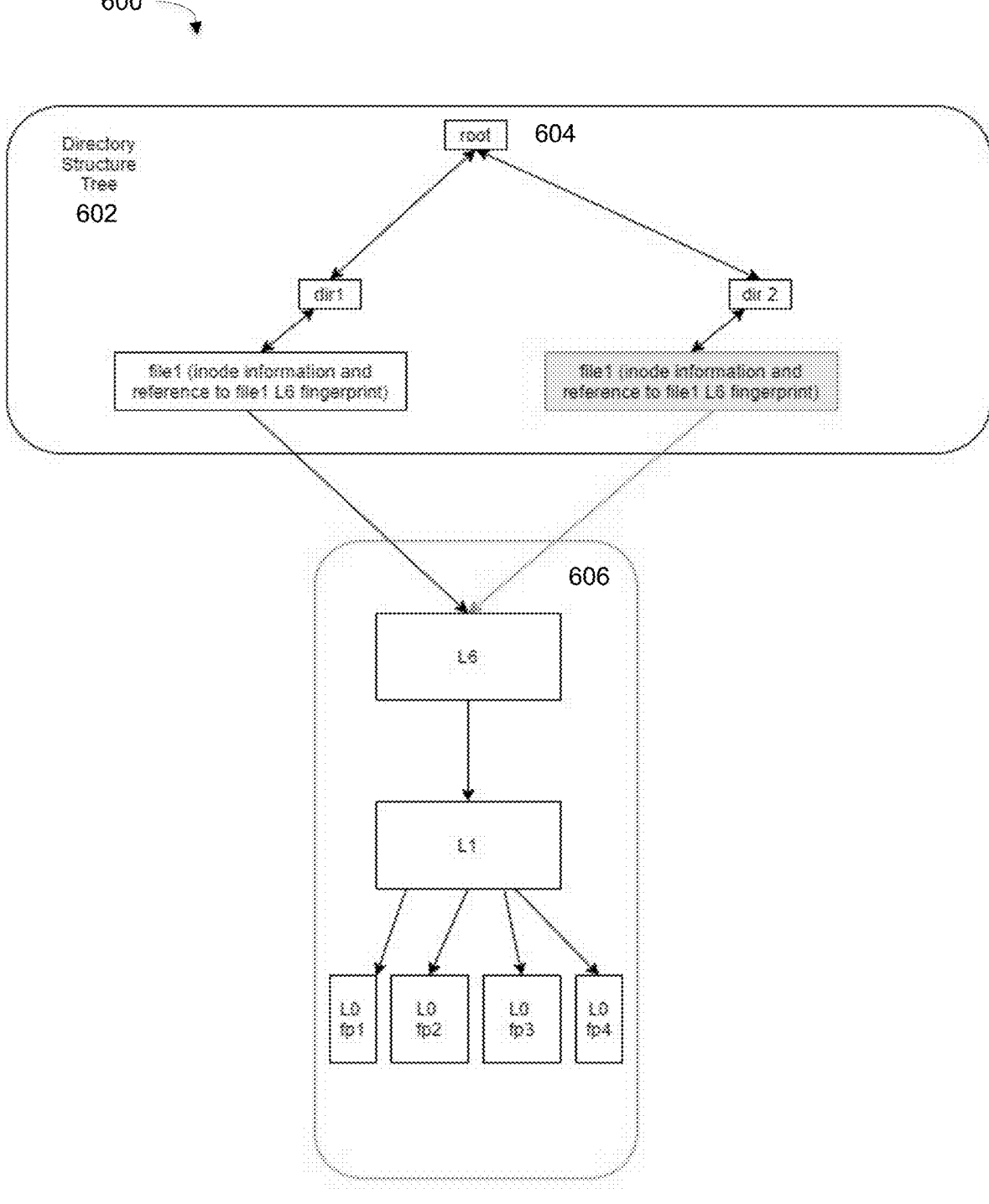
FIG. 6 is a diagram illustrating the fastcopy method of copying data, under some embodiments.

With respect to the fastcopy overwrite functionality, as described above with respect to the Merkle tree structure, the L6 segment is representative of the file and is placed in a B+ tree to form a namespace for the filesystem. The filesystem namespace is therefore a forest of the L6 segments. This provides an indirection that creates a very efficient way to create a copy of a file. If the L6 segment from an existing file were copied into another element in the B+ tree, the file has been copied. Thus, by creating another node in the B+ tree and copying a few hundred bytes worth of metadata, a file, which could be hundreds of terabytes of data has been copied. FIG. 6 is a diagram 600 illustrating the fastcopy method of copying data, under some embodiments. As shown in FIG. 6, the directory structure tree 602 comprises a root directory 604, which accesses a directory (dir1) that holds a particular file (file1). The directory tree data for file1 comprises inode information and a reference to the file1 L6 fingerprint in the associated Merkle tree 606. In general, an inode is a data structure that describes a filesystem object (e.g., file or directory). Each inode stores the attributes and disk block locations of the object data, and the metadata encapsulating data changes, access permissions, and so on.

Fastcopying dir1 to another directory, dir2, only involves copying the file1 metadata comprising the inode information and reference to the file1 L6 fingerprint in the same tree 606. This is a trivially fast operation compared to copying the entire content data in the leaf nodes of tree 606.

Virtual synthetic backups are a method to create a file based on prior generations of the backup. This technique benefits from writing only the incremental backup, while not having to pay the penalty of patching the incremental files while restoring the backup.

A second way of making virtual synthetic backups is by copying the last backup file and then overwriting the incremental segments. This is used with fixed sized segmented blocks, such as VM backups or block-based filesystem backups.

Figure 7:
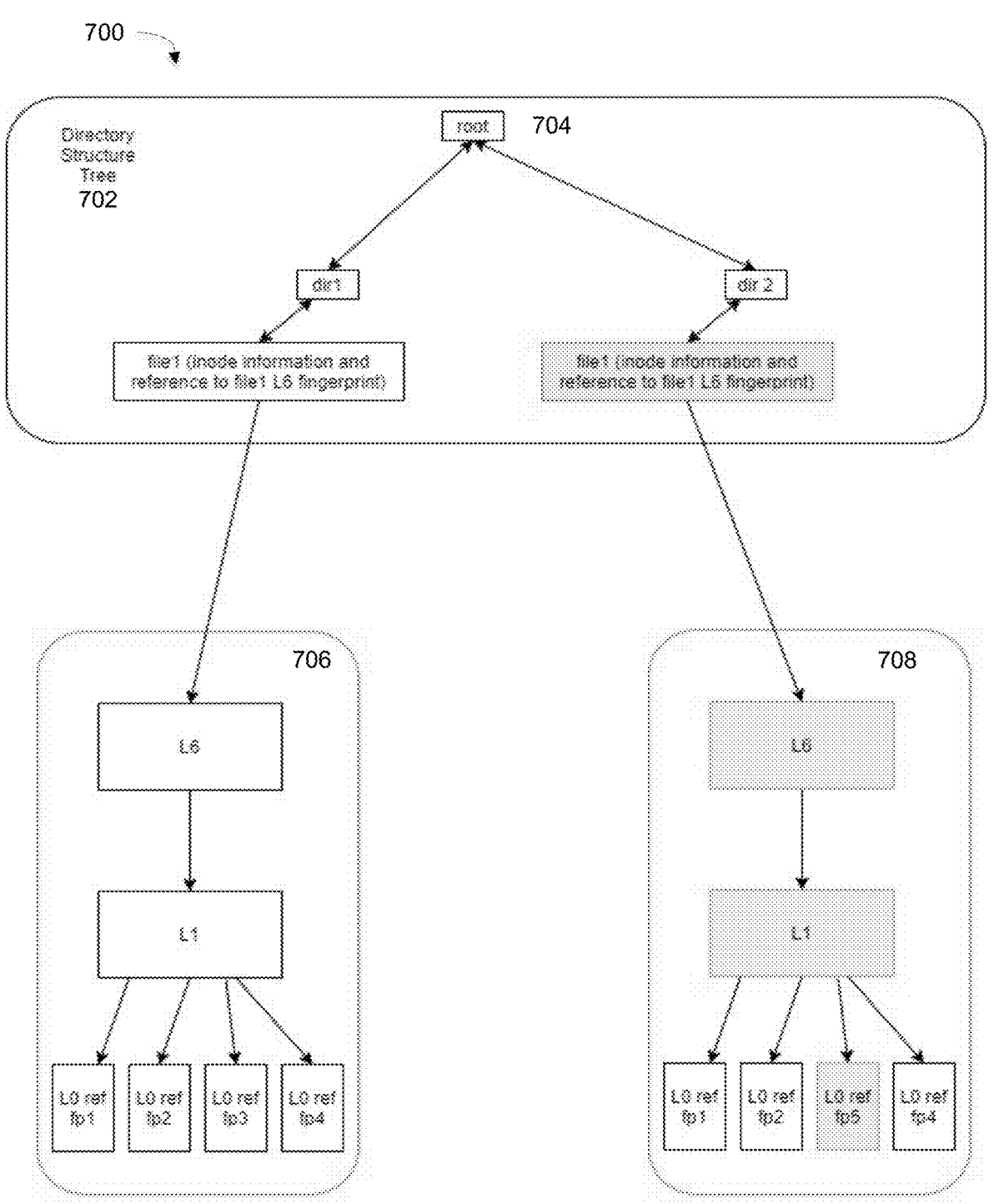
FIG. 7 illustrates an example of a fastcopy overwrite method, under some embodiments.

Since the Data Domain File System has a very efficient copying mechanism (fastcopy), this method has developed into a FCOW (fastcopy overwrite) method. The FCOW method basically calls for fastcopying the file (using the DDBoost APIs or REST APIs) and then overwriting the segments at the correct offsets over the network filesystem protocol. FIG. 7 is a diagram 700 illustrating an example of a fastcopy overwrite method, under some embodiments. As shown in FIG. 7, the directory structure tree 702 comprises a root directory 704, which accesses a directory (dir1) that holds a particular file (file1). The directory tree data for file1 comprises inode information and a reference to the file1 L6 fingerprint in the associated Merkle tree 706. As with the process 600 of FIG. 6, copying dir1 to another directory, dir2, only involves copying the file1 metadata comprising the inode information and reference to the file1 L6 fingerprint in the same tree 706. For the FCOW process, a second Merkle tree 708 is generated in which the new data blocks are inserted over any updated old data blocks. In the example of FIG. 7, fingerprint 3 (fp3) has been changed since the last previous backup, and so the L0 reference for fp5 overwrites the L0 reference for fp3 in tree 706 to produce new tree 708.

This FCOW method does not use any special APIs, and therefore does not store any synthetic information. In both these cases, i.e., virtual synthetics and FCOW, the filesystem keeps track of the relationship between the parent file (called a "basefile") and the child (called the "target file"). The filesystem keeps the relationships using extended attributes and uses these attributes to efficiently replicate the files. For virtual synthetics, the relationships are explicit as the recipe table holds the file handles of the basefiles, where a file handle uniquely identifies the file in a filesystem. The FCOW use case also uses extended attributes, but in a slightly different way. As any file is cloned, there is an extended attribute setup that describes the parent and the child.

Figure 8:
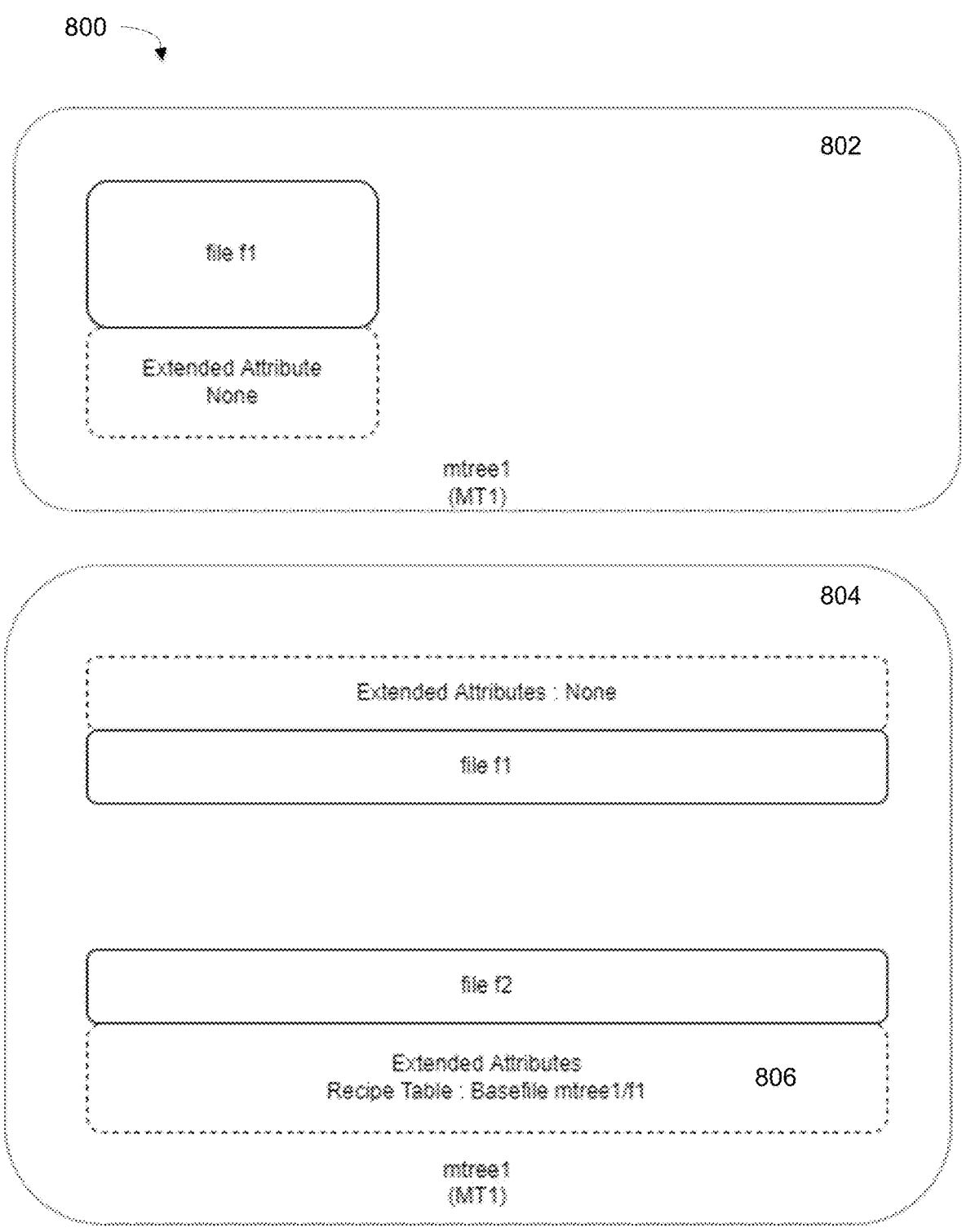
FIG. 8 illustrates the use of extended attributes with cloned files, under some embodiments.

FIG. 8 illustrates the use of extended attributes with cloned files, under some embodiments. Diagram 800 of FIG. 8 illustrates a first state 802 with file f1 in Mtree1 (MT1) with no extended attributes upon creation of the file. In a second state 804, Mtree 1 has two files, file f1 and file f2. For this state, file f2 was created from file f1 using virtual synthetic copying, and the extended attributes 806 on file f2 describe the relationship indicating that its basefile is file f1 in MT1, which can be expressed as a recipe: "Basefile: mtree1/f1," or any similar expression.

Figure 9:
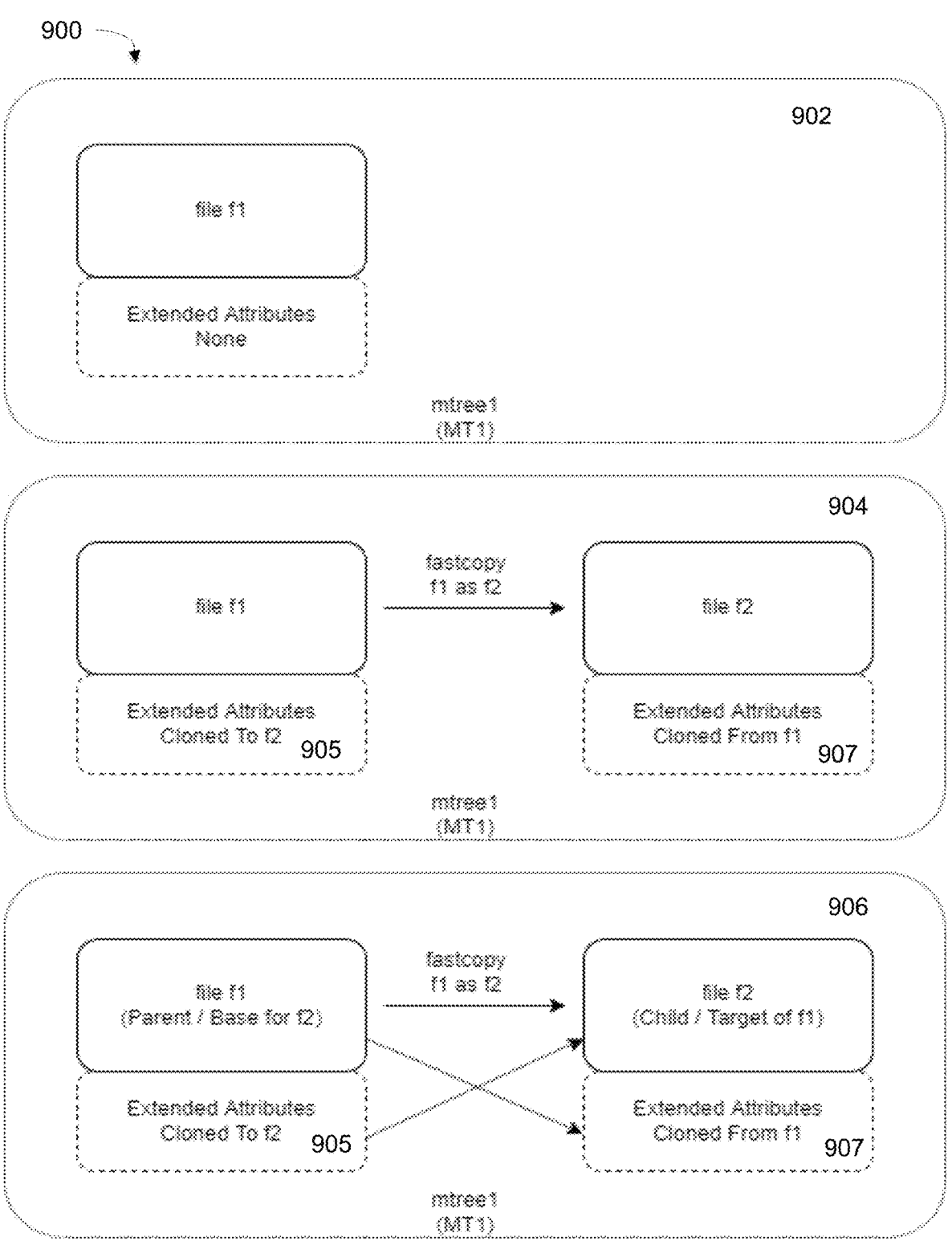
FIG. 9 illustrates example file relationships generated in an Mtree during an FCOW process, under some embodiments.

FIG. 9 illustrates example file relationships generated in an Mtree during an FCOW process, under some embodiments. As shown in diagram 900, file state 902 has only file f1 in MTree 1, and no extended attributes for this file. As part of an FCOW workflow, file f1 is cloned to file f2 using a fastcopy process as shown in file state 904. The extended attribute 905 on the file f1 point to the fact that there is a file f2 to which file f1 is cloned, and on file f2, an extended attribute 907 stores information that it was cloned from file f1. File f2 can also be referred to as the child or target of file f1, and file f1 can be described as the parent or basefile of file f2, as shown in file state 906 of FIG. 9.

Figure 10:
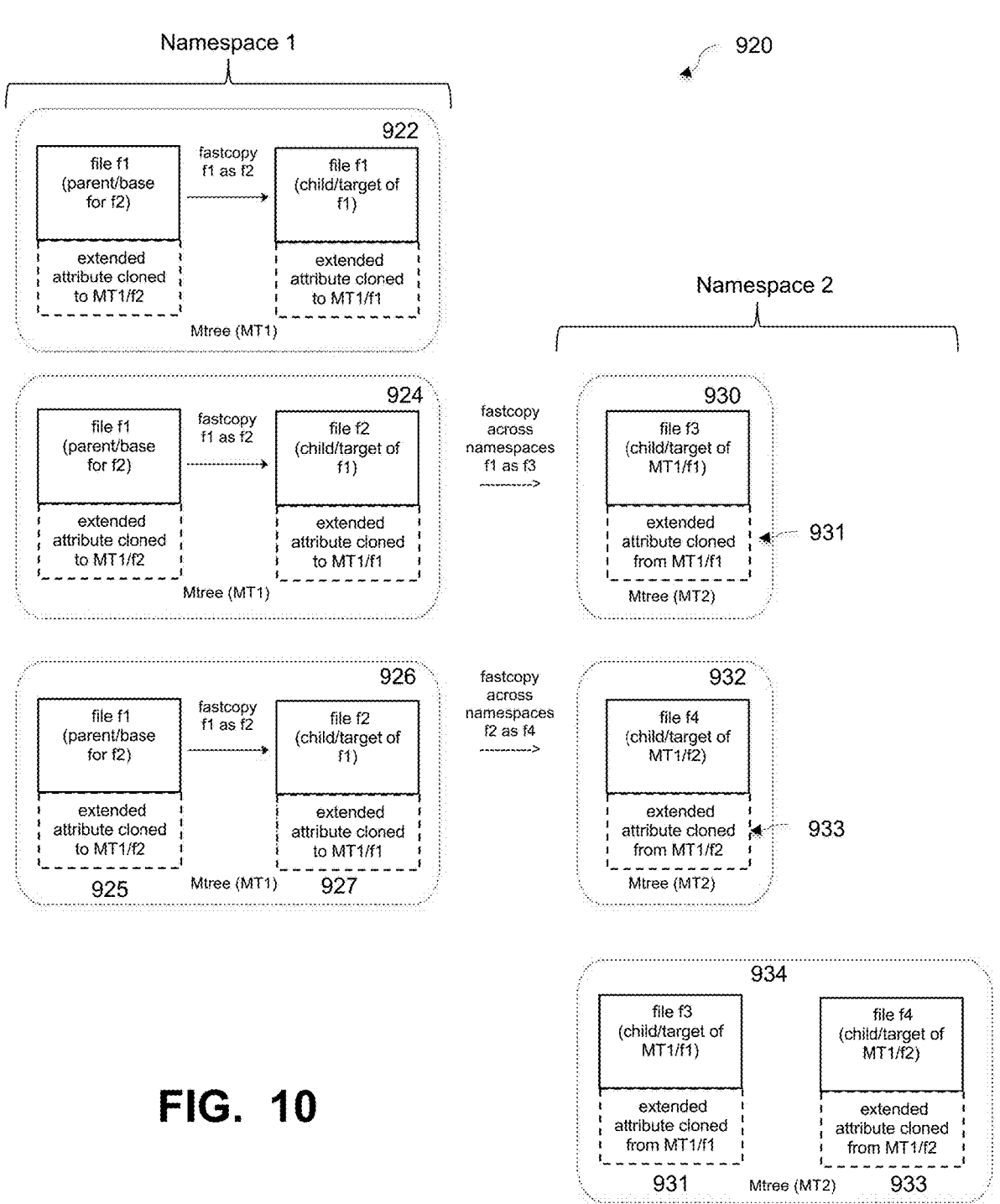
FIG. 10 illustrates the fastcopy of files across namespaces, under some embodiments.

As stated above, namespaces are used by backup systems to allow the use of names in different contexts. FIG. 10 illustrates the fastcopy of files across namespaces, under some embodiments. As shown in diagram 920 of FIG. 10, files are copied from a first namespace (Namespace 1) to a second namespace (Namespace 2), where each namespace can be a different Mtree (denoted MT1 and MT2). Within Namespace 1, the state sequence of 922 to 926 corresponds to that of state sequence 902 to 906 in FIG. 9 to produce file f2 as the child of parent file f1 after cloning f1 to make f2, with the extended attributes 925 and 927 created accordingly.

As shown in diagram 920, the file f1 is also fastcopied to another Mtree (MT2) as file f3. This copy is thus made between namespaces 1 and 2. In this case, the extended attribute 931 of the file f3 would indicate that its parent is file f1 in Mtree 1, and the recipe may be expressed as "file MT1/f1" as shown.

As further shown for this example, the file f2 is fastcopied to Mtree MT2 as file f4 as shown in file state 932, and the extended attribute 933 of file f4 indicates that MT1/f2 is the parent of file MT2/f4. At this time, if the extended attributes were to be examined, both file f3 and file f4 have extended attributes pointing to MT1/f1 and MT1/f2, respectively, as shown for file state 934.

Figure 11:
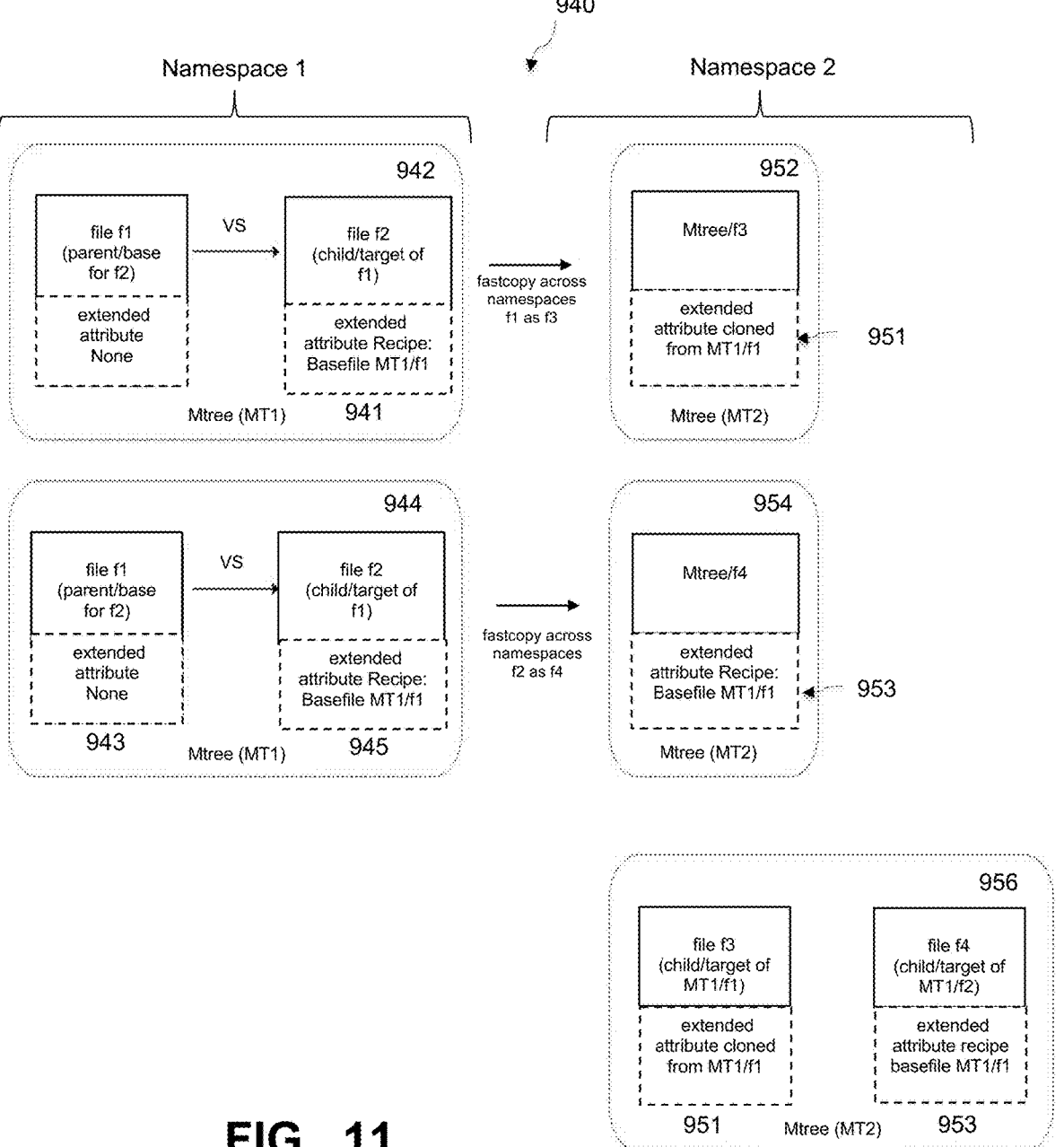
FIG. 11 illustrates the virtual synthetic copying of files across namespaces, under some embodiments.

FIG. 10 illustrates the use of extended attributes in the case of FCOW, and a similar result is obtained in the case of virtual synthetic copying. FIG. 11 illustrates the virtual synthetic (VS) copying of files across namespaces, under some embodiments. As described above with respect to VS processing, the file relationships are detailed in the recipe table.

As shown in diagram 940 of FIG. 11, files are copied from a first namespace (Namespace 1) to a second namespace (Namespace 2), where each namespace can be a different Mtree (denoted MT1 and MT2). Within Namespace 1, the file state 942 shows the VS copying of file f1 to produce file f2, where file f2 has an extended attribute 941 showing the parent of file f2 to be base file MT1/f1. File f2 is fastcopied to Mtree 2 of Namespace 2, as shown in file state 952, to produce file f3 with an extended attribute 951 indicating that its parent is file f1 in Mtree 1, where the recipe may be expressed as "file MT1/f1" as shown.

As further shown for this example, the file f2 is fastcopied to Mtree MT2 as file f4 as shown in file state 954, and the extended attribute 953 of file f4 indicates that MT1/f2 is the parent of file MT2/f4. At this time, if the extended attributes were to be examined, both file f3 and file f4 have extended attributes pointing to MT1/f1 and MT1/f2, respectively, as shown for file state 956. Thus, in the VS use case, as with FCOW, the extended attributes for file f3 and file f4 in Mtree MT2 will both point to files f1 and f2 in Mtree 1, respectively.

In general, the cloning and file relationships work well when the cloned file is within the same namespace (Mtree).

However, this may break down when the cloning goes beyond the namespaces, since cloning operates on a file-by-file basis, and the file relationships are not always preserved.

A file recipe is metadata that is created when a virtual synthetic (VS) backup file is written. The recipe by itself is the relationship of a given file (target file) to a set of prior generations of backup files (base files), and basically holds information about which portions of the given files are same. The FCOW workload, uses a copy of the last backup image and then the segments that are changed are overwritten in place (on the copy). The FCOW is done on fixed sized segmentation environments where the segmentation would not have the I/O amplification because of the segmentation. However, the FCOW workload does not create recipes since they do not use a synthetic API.

Most modern backups use virtual synthetic techniques to create synthetic full backups. These (synthetic full) backups have the advantage that they only ingest the changes, and do not need any patching for the restore operations. Modern backup filesystems like the PowerProtect Data Domain also use the virtual synthetic based tracking to enable enhanced replication performance when replicating VS files. This is done by complex tracking of file relationships between generations of the backup files.

In cases where the backup namespace is sub-copied into other namespace, these relationships are not always preserved, and the filesystem is not able leverage the replication enhancements upon further replication of the files from the subcopy namespace. This can lead to increased times required for replication and potential problems in meeting replication service level agreements (SLAs).

File relationships can be leveraged in several different use cases. One such use case is replication. For this operation, consider a file f1, and a file f2 which is created using segments of f1. As described above, as file f2 was created, the recipe to generate f2 was recorded as part of file recipe in the extended attributes. With replication, when file f1 was replicated to a disaster recovery (DR) site, there was no base file to f1, and the entire file must be sent over the network. The filesystem however records that a copy of file f1 has been replicated to the DR site. When file f2 is to be replicated, given that the filesystem knows that file f1's copy is available and unchanged, the filesystem generates a copy of file f2 leveraging the copy of f1 and the information in the file recipe.

Embodiment of process 120 use implicit, opportunistic and/or explicit methods to set or fix the extended attributes showing parent-child relationships to reap the benefits of this information between namespaces.

Implicit Fixing of File Relationships

Fastcopy has a method wherein the entire namespace or a sub-tree within the name space is copied. This method is employed, for example, when the entire Mtree must be copied to another Mtree, or as a directory in another Mtree.

As an embodiment PowerProtect Cyber Recovery (and similar products) uses this method to take point-in-time (PIT) copy of the replica Mtree. When replicating the entire namespace, process 120 is configured to fix the file relationships among files in an implicit manner, i.e., based only on knowledge of the namespace copy.

Figure 12:
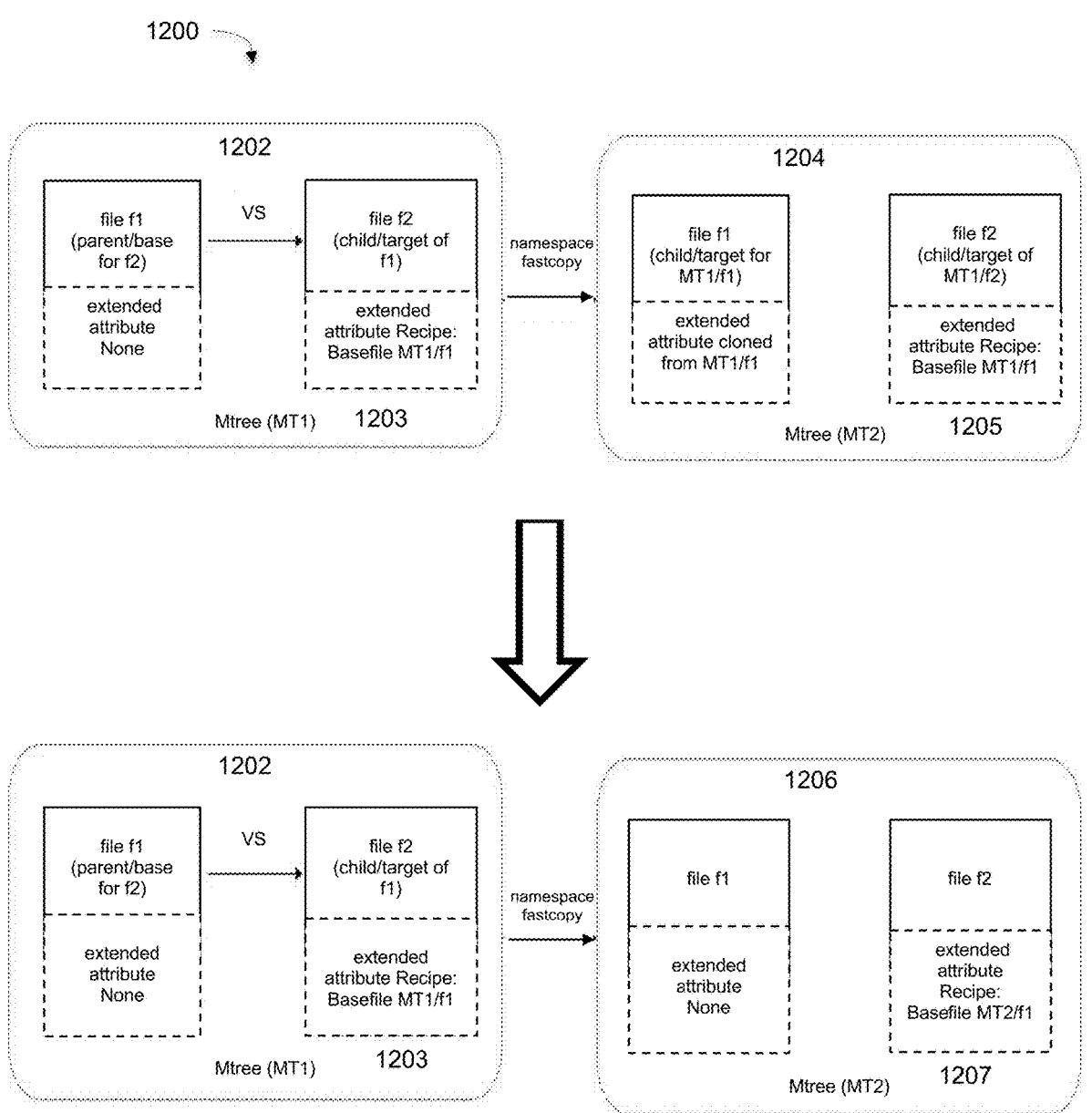
FIG. 12 illustrates fixing or maintaining file relationships for cloned files implicitly for VS copies, under some embodiments.

FIG. 12 illustrates fixing or maintaining file relationships for cloned files implicitly for VS copies, under some embodiments. Diagram 1200 of FIG. 12 illustrates file state 1202 in which file f2 in Mtree MT1 is created by VS copying file f1 using virtual synthetic APIs, and has the synthetic recipe in the extended attributes 1203. In a case where the Mtree MT1 is namespace cloned to Mtree MT2, as shown in file state 1204, the files would clone with the same relative path. However, the file relationships are lost. This is because the extended attributes for MT2/f1 will state that it was cloned from file MT1/f1 and the file MT2/f2 will have the recipe which is a copy of the recipe of the parent file MT1/f2. This recipe points to the data segments in file MT1/f1 and not file MT2/f1, as shown in extended attributes 1205. The issue this creates is that if the second namespace (MT2) were to be replicated or differenced, it would not be able to generate the same data or efficiencies that the first namespace would generate. For example if files f1 and f2 were to be diffed in MT1, the system could leverage the file relationships to give exact differences between the files. Whereas in MT2, both files point to a different namespace, and if they were replicated over to another system, it is not possible to go back to MT1 to determine the differences.

In an embodiment, process 120 uses the fact that the filesystem knows that it is a namespace copy operation in which all files in a first namespace are copied as is to the second namespace. This allows the system to fix the file parent-child relationships among all of the complete files that are copied over so that they are local to the namespace through the extended attributes. As further shown in FIG. 12, the original file state 1202 with extended attribute 1203 is fixed after the namespace fastcopy operation with extended attribute 1207 showing basefile MT2/f1 for file f2 in file state 1206.

To accomplish this, process 120 checks the system for the file relationships. If those exist, and the extended attributes point to a namespace local file, then the corresponding file is looked up in the target's local Mtree (using the same relative path and filename), and the file handle be implanted in the copied recipe table. Through this process, the parent-child relationship is fixed in the extended attributes of the target file to indicate that the parent-child relationship for the copied file (f2) includes the second namespace in its extended attributes.

Figure 14:
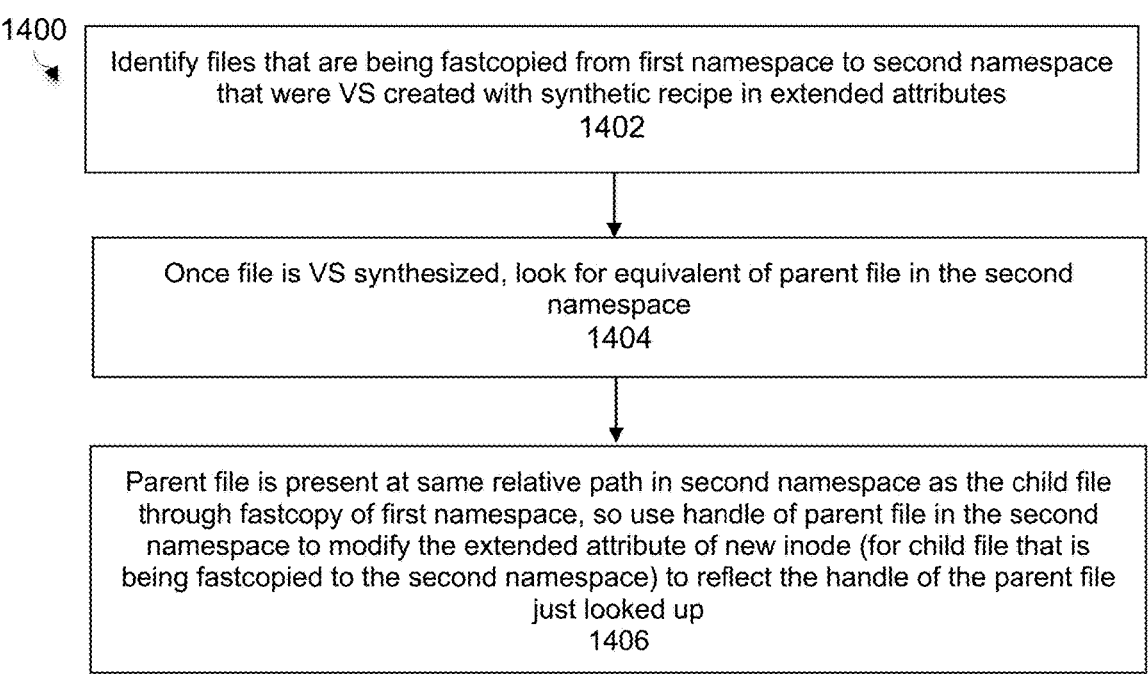
FIG. 14 is a flowchart that illustrates a method of fixing file relationships for cloned files implicitly for VS copies, under some embodiments.

FIG. 14 is a flowchart that illustrates a method of fixing file relationships for cloned files implicitly for VS copies, under some embodiments. As shown in FIG. 14, process 1400 begins with step 1402 by identifying during the fastcopy from the first namespace to the second namespace, the files which were VS synthesized (when they were backed up in the first namespace). Such files would have the VS basefile (parent) information set in their extended attribute in the first namespace.

This basefile information indicates the parent file (in the first namespace) from which the file being evaluated was synthesized. Once the file has been determined to be VS synthesized, the process looks for the equivalent of the parent file as set in the extended attribute of the file under evaluation (i.e., step 1402) in the second namespace, 1404. This equivalent would have been created when the parent file was fastcopied to the second namespace. Since the complete first namespace is being fastcopied, the parent file will be present at the same relative path in the second namespace as the child file, 1406.

Some examples of looking up the parent per the relative path methodology of FIG. 14 follow. For these examples, in the first "namespace/namespace1/dir_1/dir_2/dir_3/dir_child/child" was synthesized from "/namespace1/dir_1/dir_2/dir_3/dir_parent/parent."
If the child is being fastcopied from "/namespace1/dir_1/dir_2/dir_3/dir_child/child" to "/namespace2/dir_xyz/dir_abc/dir_3/dir_child/child," the parent should be looked for at "/namespace2/dir_xyz/dir_abc/dir_3/dir_parent/parent" in the second namespace.
If the child is being fastcopied from "/namespace1/dir_1/dir_2/dir_3/dir_child/child" to "/namespace2/dir_1/dir_2/dir_3/dir_child/child" the parent should be looked for at "/namespace2/dir_1/dir_2/dir_3/dir_parent/parent" in the second namespace.
If the child is being fastcopied from "/namespace1/dir_1/dir_2/dir_3/dir_child/child" to "/namespace2/dir_2/dir_3/dir_child/child," the parent should be looked for at "/namespace2/dir_2/dir_3/dir_parent/parent" in the second namespace.

In another example, assume "/namespace1/dir_1/dir_2/dir_3/dir_child/child" was synthesized from "/namespace1/dir_4/dir_5/dir_3/dir_parent/parent." If the child is being fastcopied from "/namespace1/dir_1/dir_2/dir_3/dir_child/child" to "/namespace2/dir_2/dir_3/dir_child/child," the parent should be looked for at "/namespace1/dir_5/dir_3/dir_parent/parent" in the second namespace.
If the child is being fastcopied from "/namespace1/dir_1/dir_2/dir_3/dir_child/child" to "/namespace2/dir_1/dir_2/dir_3/dir_child/child," the parent should be looked at "/namespace2/dir_4/dir_5/dir_3/dir_parent/parent" in the second namespace.

A similar lookup can be done for the parent file in the second namespace if the child file in the second namespace has the directory structure which has one level more than the first namespace.

Now, using the handle of this parent file in the second namespace the process modifies the extended attribute of the newly created inode (for the child file which is being fastcopied to the second namespace) to reflect the handle of the parent file that was looked up, 1406.

For process 1400, steps 1402 to 1404 are performed for every file that are fastcopied from namespace 1 to namespace 2. Thus, for an entire namespace copy operation, the files are each cloned one-by-one and the extended attributes are fixed as new inodes are created in the second namespace. For the VS case, the term 'fixing' means to amend the recipe in the extended attributes to reflect the second namespace for the child file in the second namespace by modifying the metadata in the extended attributes accordingly.

In an embodiment, the extended attributes comprise metadata encapsulating path or recipe information to generate a child file from the parent. In a large-scale deployment, amending or fixing the appropriate parent and/or child file extended attributes in the second namespace involves only modifying metadata, which usually a very fast operation.

In an embodiment, the extended attributes are stored for process 1400 as VSS (variable segment size) files versus fixed size segmented files. The VSS method uses a recipe to state the parent-child file relationships (as used for VS copies), while the fixed size method uses an explicit parent-child statement, as used by FCOW copies.

The same process described above can be used with clones produced through FCOW versus VS copies. The file relationships for FCOW files are two-way so that the parent knows about the child file, and the child file knows about the parent, as opposed to the VS case where only the child knows about the parent but the parent does not know about the child. Thus, for the VS case, the relationships are fixed only in the context of the child (target) file, as shown in FIG. 12, whereas for the FCOW case, the relationships must be fixed for both the parent and child files to maintain the two-way referencing between parent and child files.

Figure 13:
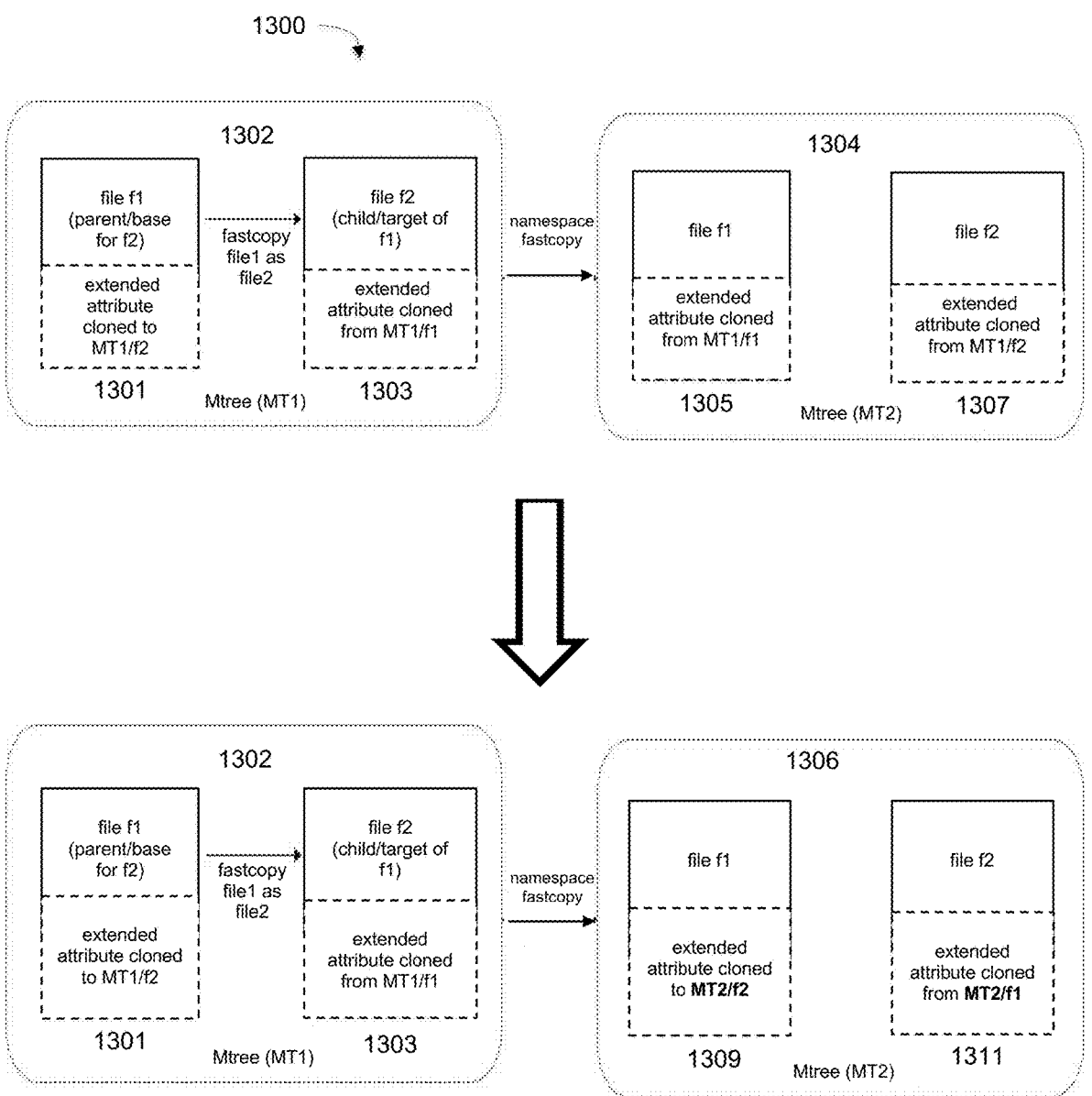
FIG. 13 illustrates fixing or maintaining file relationships for cloned files implicitly for FCOW copies, under some embodiments.

FIG. 13 illustrates fixing or maintaining file relationships for cloned files implicitly for FCOW copies, under some embodiments. Diagram 1300 of FIG. 13 illustrates file state 1302 in which file f2 in Mtree MT1 is created by FCOW copying file f1 having extended attributes 1301 to file f2 having extended attributes 1303. In a case where the Mtree MT1 is namespace cloned to Mtree MT2, as shown in file state 1304, the files would clone with the same relative path. However (as in the case of FIG. 12), the file relationships are again lost since the extended attributes for MT2/f1 will state that it was cloned from file MT1/f1 and the file MT2/f2 will have the recipe which is a copy of the recipe of the parent file MT1/f2. This recipe points to the data segments in file MT1/f1 and not file MT2/f1, as shown in extended attributes 1305 and 1307.

In an embodiment, process 120 uses the fact that the filesystem knows the intent in the namespace fastcopy operation, and so can fix the file relationships so that they are local to the target namespace. As shown in FIG. 13, the original file state 1302 with extended attributes 1301 and 1303 are fixed after the namespace fastcopy operation with extended attribute 1309 for file f1 in MT2 and extended attribute 1311 for file f2 in MT2. Since the FCOW process is a two-way reference wherein the parent and child files both know about each other, the extended attributes for each parent and child file must be fixed (unlike the VS case of FIG. 12, where only extended attributes 1207 for the child file were fixed).

As part of the namespace fastcopy operation, process 120 looks up the file mentioned in the extended attribute in the target local Mtree, and substitutes the file handle to preserve the relationship. After this substitution, the namespace fastcopy operation will reflect the following extended attributes, as shown in file state 1306.

Figure 15:
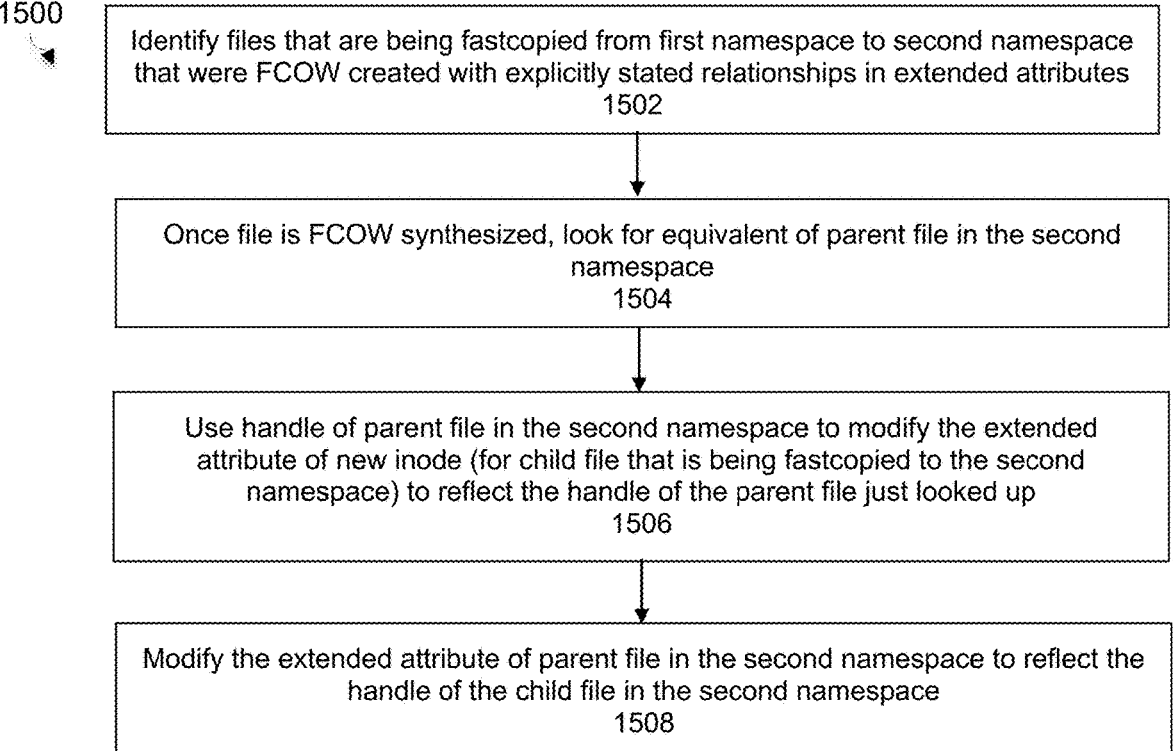
FIG. 15 is a flowchart that illustrates a method of fixing file relationships for cloned files implicitly for FCOW copies, under some embodiments.

FIG. 15 is a flowchart that illustrates a method of fixing file relationships for cloned files implicitly for FCOW copies, under some embodiments. As shown in FIG. 15, process 1500 begins in step 1502 with identifying the files which were fastcopy-overwrite (FCOW) created. Any such file would have the information about the parent file which was fastcopied to create the file as an extended attribute. When a file is fastcopied to create a child file (which will have the modified data vis-a-vis the parent file overwritten at the requisite offsets), a reference to the child file is created in the extended attribute of the parent file as well.

Once the file has been determined to be FCOW synthesized, the process finds the equivalent of its parent file in the second namespace, 1504. This equivalent would have been created when the parent file was fastcopied to the second namespace. As in the VS case the parent file will be present at the same relative path in the second namespace as the child file. Example cases of looking up the relative path in the second namespace are as provided above for implicit fixing of basefile information for VS synthesized file.

Using the handle of this parent file in the second namespace, for the child file which is being fastcopied to the second namespace, the process then modifies the extended attribute of the newly created inode in the second namespace to reflect the handle of the parent file just looked up, 1506. Similarly, the extended attribute of the parent file in the second namespace is modified to reflect the handle of the child file in the second namespace, 1508. This completes the two-way fixing of the basefile information for both the parent and the child file for the FCOW case.

With respect to FCOW, the term 'fixing' means to amend the extended attributes for both parent and child files in the second namespace to reflect the second namespace of child and parent file.

Given that this is namespace level cloning where all files of the first namespace are copied over, the relative path of the file is within the source in the target Mtree. For example, if attributes point to MT1/a/b/c/f1, the system can perform a file lookup for MT2/a/b/c/f1.

The process of FIGS. 14 and 15 are both termed 'implicit' in that the system knows that the entire namespace and all of its files are being copied all together to another namespace, so that their relative paths must be the same.

In an embodiment, the process also determines that the target file is the same file as the source. System such as Data Domain use a mechanism, such as the orig-top-ref hash that is stored along with the content handle for the file. If the orig-top-ref hash value is same for two files, they are deemed to be identical. This hash is created by rolling up the checksum of the Merkle tree. In this embodiment, the namespace fastcopy operation must also enumerate and clone in the file creation order (oldest files first), to achieve the desired effect.

The orig-top-ref is generally a mathematical process using a comparison operation to determine whether or not two files are identical, and any other similar technique can also be used. This check essentially verifies that no outside person or process improperly modified a file to guarantee that the relationships are maintained for same pairs of files before and after the cloning process.

Opportunistic Fixing of File Relationships

The implicit method described is utilized for use cases where the entire namespace is being cloned. If a portion of a namespace (sub-namespace) is being cloned, process 112 employs a varied method, referred to as an 'opportunistic' method, in that the file being copied must be present at the same related namespace. For this embodiment, it is not implicitly known that everything in MT1 is being copied over to MT2, so that when (for example) f2 is copied over, the process looks to see whether f1 exists in the same relative path in MT2. This type of use case may occur when the retention policy for a few backup are to be changed, so that only those files are cloned to a second namespace, as a subcopy of the original namespace.

It should be noted that this embodiment is directed to the cloning of data subsets from a first or 'source' namespace to a second or 'target' namespace. Such a subset of data may comprise a file, a subset of files within a directory. A file may be of any appropriate size, and may be organized into a subdirectory or subtree within a directory tree, a subdivision within a namespace, or any other set or partial dataset organized within the filesystem.

Figure 16:
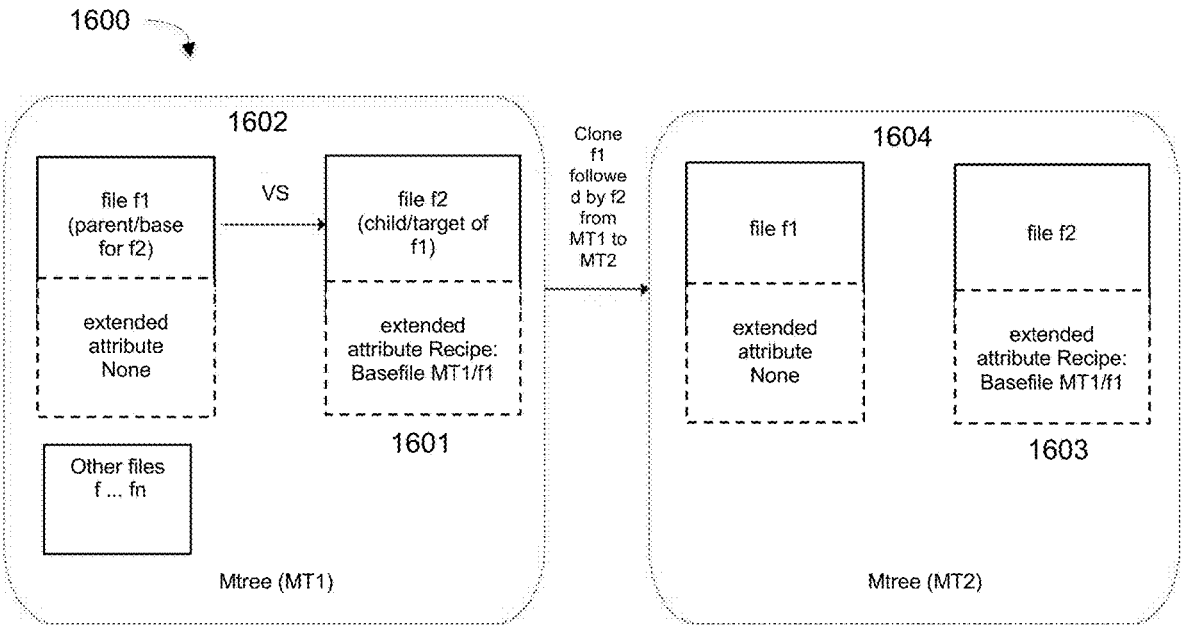
FIG. 16 illustrates a file copy operation by VS using opportunistic fixing of file relationships, under some embodiments.

FIG. 16 illustrates a file copy operation by VS using opportunistic fixing of file relationships, under some embodiments. As shown in diagram 1600 of FIG. 16, a first namespace (MT1) has files f1 and f2, along with other files f3 to fn, in a file state 1602. Only files f1 and f2 are to be cloned to the second namespace (MT2) as shown in file state 1604.

In this case, it is not implicitly known that everything in MT1 is being copied over to MT2, so that when (for example) f2 is copied over, the process looks to see whether f1 exists in the same relative path in MT2. This type of use case may occur when the retention policy for a few backup are to be changed, so that only those files are cloned to a second namespace, as a subcopy of the original namespace.

In the opportunistic fixing embodiment, process 120 looks for a file with the same name in the relative path in the target Mtree (MT2). To determine that the target file is a clone of the file on the source Mtree (MT1), it compares the orig-top-ref hash, which is based on the file content.

Using the example as in the implicit namespace cloning method described above if the files MT1/f1 and MT1/f2 were to be cloned one after the other the extended attribute is copied from the source. For recipe-based tracking files (VS files), the extended attribute of file f2 would call out its base file in MT1/f1. This issue is illustrated in FIG. 16, wherein the relationship between files f1 and f2 are lost due to this identical recipe in extended attributes 1601 and 1603.

Embodiments of process 120 address this issue for sub-copies through an opportunistic relationship fixing method. This method looks up, in its relative path, file 1 with the Mtree2. If the file does not exist, there is nothing further to be done. If, however, it does exist, the system must check that file 1 on MT2 is the same as file f1 in MT1. To achieve that, it compares the orig-top-ref for the file f1 in MT1 and the file f1 in MT2. If the orig-top-ref match, then it would fix the file relationships by updating the recipe table in the extended attributes.

Figure 17:
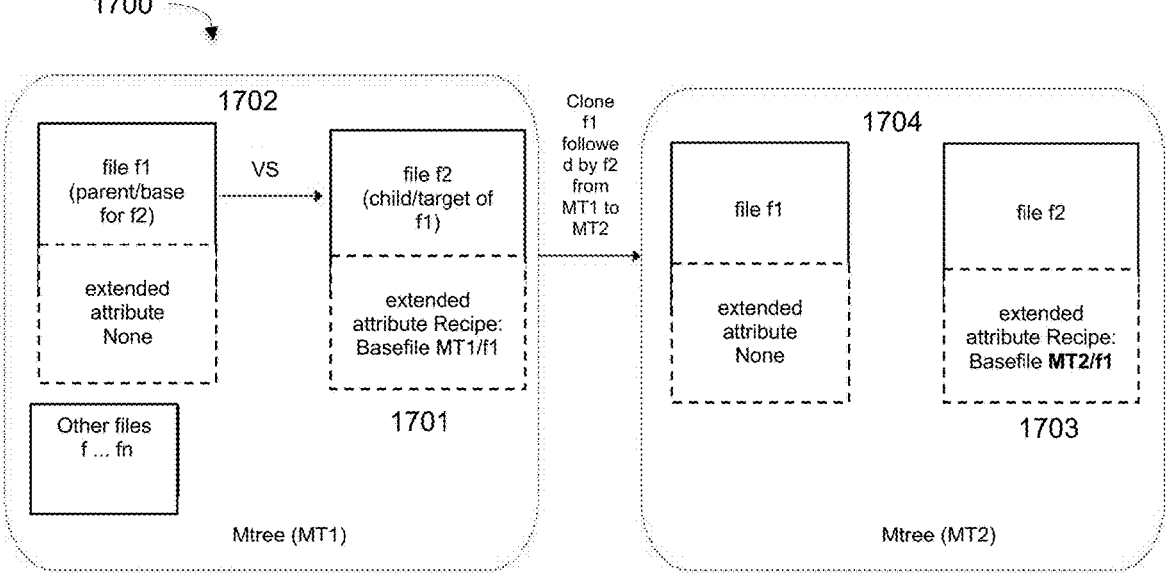
FIG. 17 illustrates the effect of an opportunistic fix operation on the files of FIG. 16, under an example embodiment.

FIG. 17 illustrates the effect of an opportunistic fix operation on the files of FIG. 16, under an example embodiment. As shown in diagram 1700 of FIG. 17, the extended attribute 1701 for file f2 in MT1 (file state 1702) has been fixed to reference MT2 (instead of MT1) for the recipe in extended attribute 1703 for file f2 after VS copying to MT2 (file state 1704).

FIGS. 16 and 17 illustrate the opportunistic fixing method for VS copies, and such a process is similar for FCOW datasets, with the difference that since the relationships are two-way in the FCOW case, they will be established in the context of the clone operation of the target file.

Figure 18:
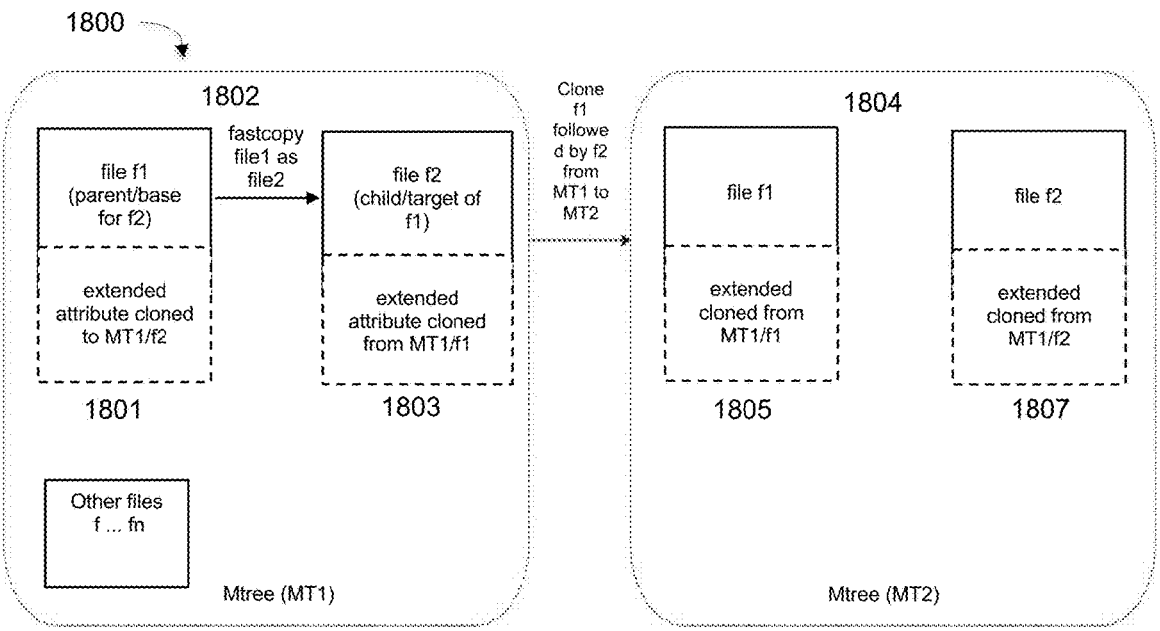
FIG. 18 illustrates a file copy operation by FCOW using opportunistic fixing of file relationships, under some embodiments.

FIG. 18 illustrates a file copy operation by FCOW using opportunistic fixing of file relationships, under some embodiments. As shown in diagram 1800 of FIG. 18, a first namespace (MT1) has files f1 and f2, along with other files f3 to fn, in a file state 1802. Only files f1 and f2 are to be cloned to the second namespace (MT2) as shown in file state 1804. Since this is FCOW copying, in MT1, file f1 has extended attributes 1801 referring to child file f2, and file f2 has extended attributes 1803 referring to parent file f1.

Using the example as in the implicit namespace cloning method described above, if the files MT1/f1 and MT1/f2 were to be cloned one after the other, the extended attributes are likewise copied from the source. For FCOW copying, the extended attribute 1805 of file f1 in MT2 would call out it source MT1/f1, and the extended attribute 1807 for file f2 would call out its source MT1/f2. This issue is illustrated in FIG. 18, wherein the relationship between files f1 and f2 are lost due to this lack of two-way referencing in extended attributes 1805 and 1802 with respect to the files f1 and f2 in the new namespace MT2.

Figure 19:
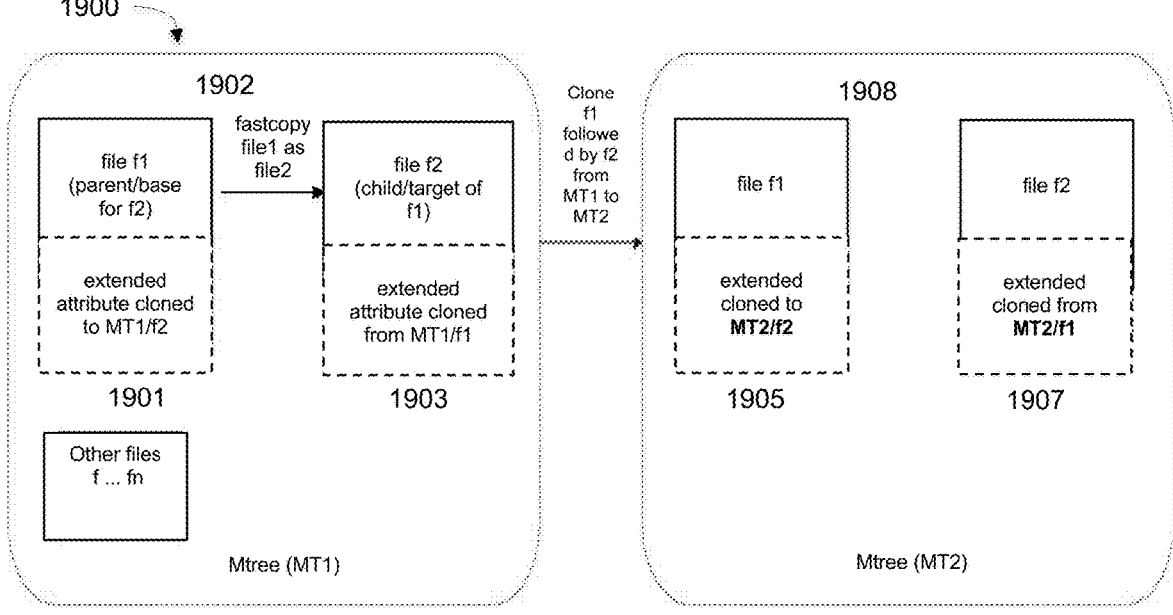
FIG. 19 illustrates the effect of an opportunistic fix operation on the files of FIG. 18, under an example embodiment.

In the opportunistic fixing embodiment, process 120 looks for a file with the same name in the relative path in the target Mtree (MT2). To determine that the target file is a clone of the file on the source Mtree (MT1), it compares the orig-top-ref hash, which is based on the file content. FIG. 19 illustrates the effect of an opportunistic fix operation on the files of FIG. 18, under an example embodiment. As shown in diagram 1900 of FIG. 19, MT1 has file f1 with extended attributes 1901 referencing child file f2, which has extended attributes 1903 referencing parent file f1 (for file state 1902).

Process 120 looks up the file corresponding to the extended attribute at the same relative path in the target Mtree (MT2). If the file exists, and the orig-top-ref matches, the filesystem will fix the extended attributes to reflect the relationship between files f1 and f2. Since this is being done file-by-file, when file f1 is cloned, file MT2/f2 doesn't exist. However, when file f2 is being cloned and the file MT2/f1 exists, the cloning process would fix the relationships by changing the attribute for MT2/f1 and MT2/f2. Thus, as shown in FIG. 19, the extended attribute 1905 for file f1 in MT2 is fixed to reference file 2 in MT2 (MT2/f2), and extended attribute 1907 for file f2 in MT2 is fixed to reference file 1 in MT2 (MT2/f1), for file state 1908.

Figure 20:
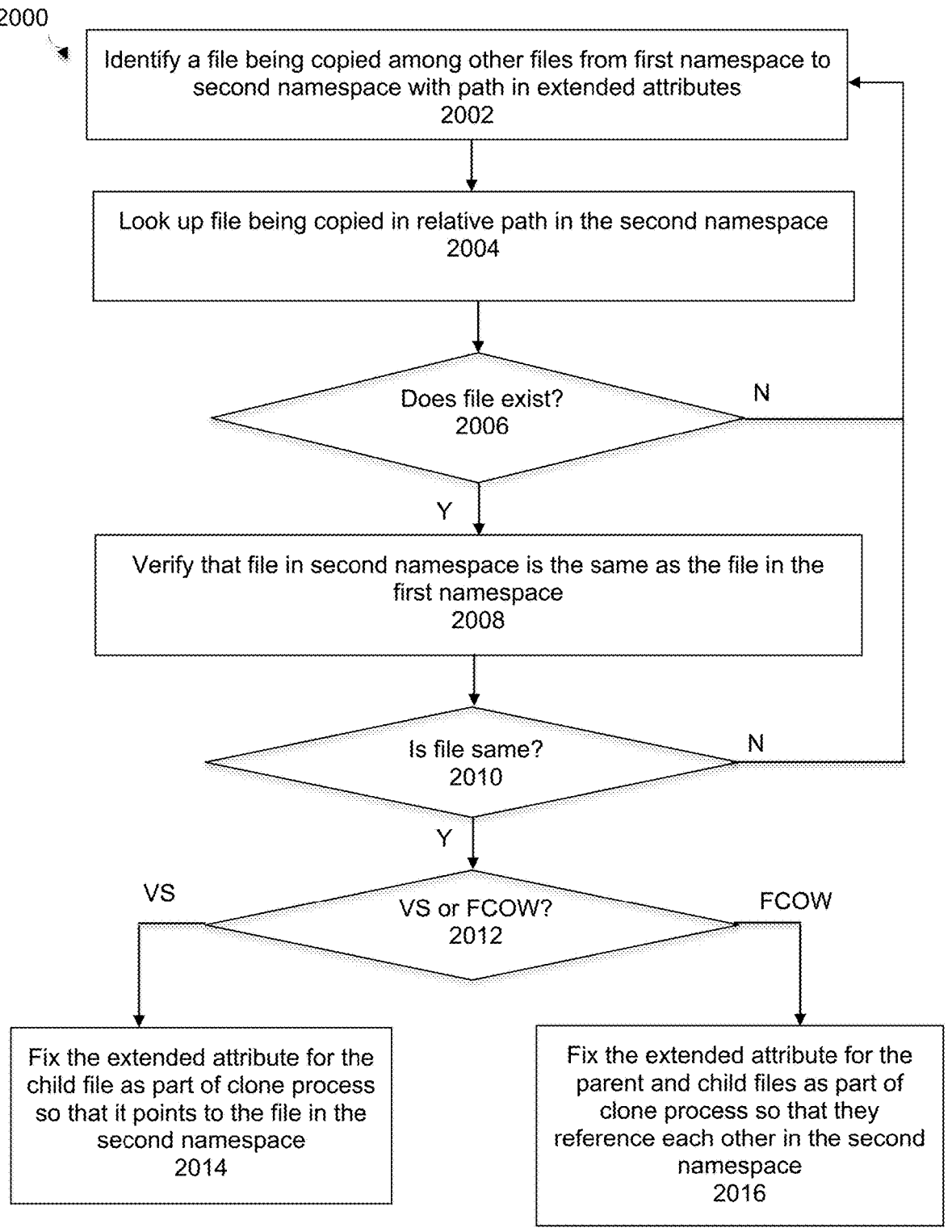
FIG. 20 is a flowchart illustrating a method of opportunistically fixing file relationships for either VS or FCOW cloning between namespaces, under some embodiments.

FIG. 20 is a flowchart illustrating a method of opportunistically fixing file relationships for either VS or FCOW cloning between namespaces, under some embodiments. Process 2000 of FIG. 20 begins with identifying a file to be copied from a first namespace to a second namespace with the path specified in the extended attributes. The file is one of several files in the first namespace, with not all files being copied, and is thus part of a subcopy of the first namespace.

In step 2004, the process looks up the file being copied in the second namespace. This is done by performing a name search in the same relative path of the namespaces to see whether or not the file exists. This is essentially a trial and error process to see if a file by the same name exists. If it does exist, as determined in step 2006, the system then verifies whether or not the files are identical through a check of the orig-top-ref hash values, 2008. This prevents the use of any file that may happen to have the same name from compromising the relationship between files that are valid copies.

For validly copied files, the system performs the fix of the extended attributes based on whether a VS or FCOW copying process is used, as determined in step 2012. If it is a VS copy, the extended attribute is fixed for the child file as part of the clone process so that it points to the file in the second namespace, 2014. If it is a FCOW copy, the extended attribute is fixed for both the parent and child files as part of the clone process so that they maintain their cross-references to each other in the second namespace, 2016.

It should be noted that the opportunistic method of FIG. 20 looks for files with the same name at the same relative path as the source. For example if file f2 were at <mtree root-MT1>/<dir 3>/<dir 4>/f2 and the base file f1 was at <mtree root MT1>/<dir 3>/<dir 4>/f1; upon cloning file f2, this method would look for a file f1 in <mtree root MT2>/ <dir 3>/<dir 4>/f1.

It should further be noted that this method works for certain backup applications that maintain the path/name after a cloning operation. If the relative path/name is not consistent with the source, the opportunistic method generally fail.

Embodiments of the processes and techniques described above can be implemented on any appropriate backup system operating environment or filesystem, or network server system. Such embodiments may include other or alternative data structures or definitions as needed or appropriate.

Figure 21:
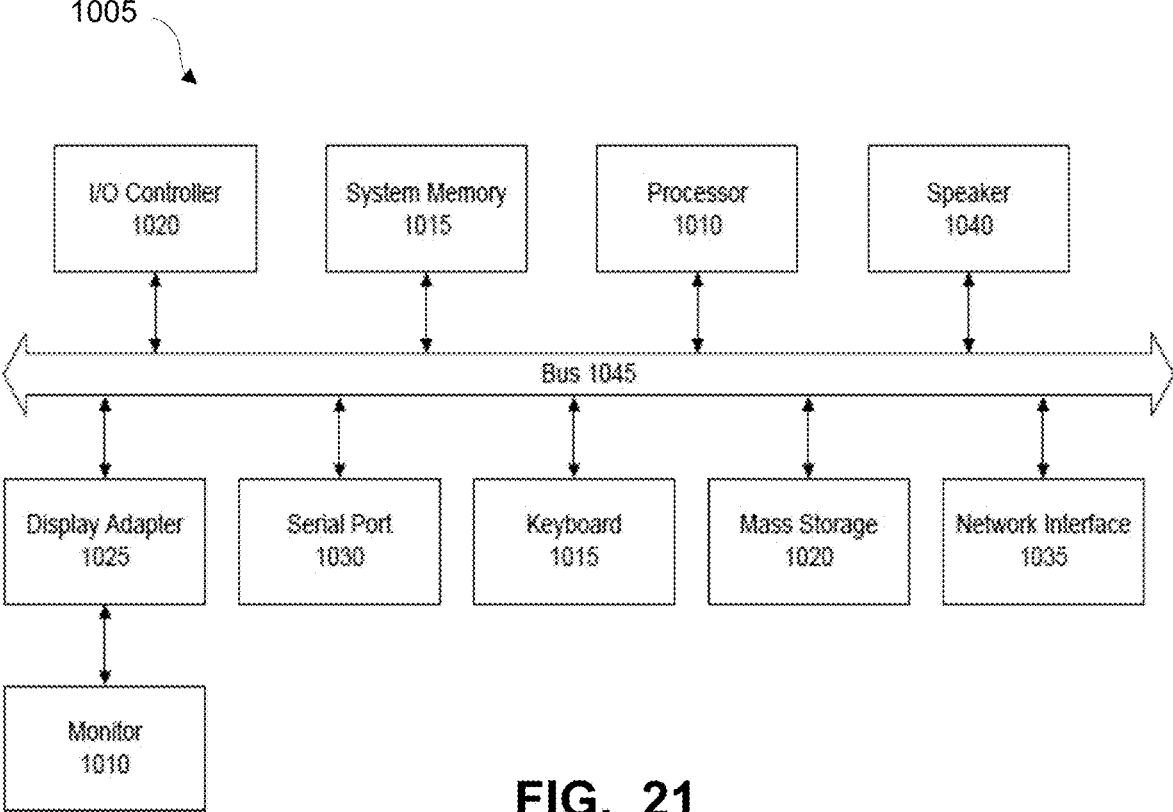
FIG. 21 is a block diagram of a computer system used to execute one or more software components of the methods and processing component described herein, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 21 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (e.g., IEEE standards 802.x), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of maintaining parent-child file relationships when cloning an entire first namespace to a second namespace, comprising:

fastcopying a parent file to a child file within the first namespace, wherein the child file has target extended attributes indicating a path relationship to the parent file;

cloning the first namespace to the second namespace including the parent file and child file to generate a cloned parent file and cloned child file in the second namespace;

finding the path relationship between the cloned parent file and cloned child file in the second namespace; and amending the found path relationship in target extended attributes of the cloned child file to reference the cloned parent file in the second namespace.

2. The method of claim 1 wherein the fastcopying comprises making a virtual synthetic (VS) copy of the parent file to generate the child file, and wherein the target extended attributes of the child file comprise a synthetic recipe consisting of metadata specifying how to generate the child file.

3. The method of claim 1 wherein the fastcopying comprises making a fastcopy overwrite (FCOW) copy of the parent file to generate the child file, and wherein the target extended attributes of the child file consist of metadata specifying how to generate the child file.

4. The method of claim 3 wherein the parent file has base extended attributes indicating a path relationship to the child file, the method further comprising amending a path relationship in the parent extended attributes of the cloned parent file to reference the second namespace for the cloned parent file in the second namespace.

5. The method of claim 1 wherein the cloning comprises a namespace fastcopy operation.

6. The method of claim 5 further comprising cloning each file in the first namespace to the second namespace and fixing respective extended attributes for each pair of parent and child copied files as new inodes are created in the second namespace for corresponding cloned parent and child files.

7. The method of claim 5 wherein the amending maintains an original relative file relationship between the cloned parent and child files in the second namespace to leverage optimizations provided by the copying step with respect to subsequent replication or differencing operations.

8. The method of claim 7 wherein the replication or differencing operations are performed by backup software in a deduplication backup system comprising a data storage server running a Data Domain File System (DDFS).

9. The method of claim 8 wherein files of the deduplication backup system are stored in a Merkle tree structure with content data stored in a bottom level of the tree and indexed by fingerprints, and further wherein the copying step copies metadata of a parent file comprising inode information and a reference to the file L6 fingerprint in a first Merkle tree to a second directory for a child file.

10. The method of claim 9 wherein the amending step comprises fixing metadata of at least one of the target extended attributes of the cloned child file or base extended attributes.

11. A computer-implemented method of maintaining parent-child file relationships when cloning a portion of a first namespace to a second namespace, comprising:

virtual synthetic (VS) copying a parent file to a child file within the first namespace wherein the first namespace contains additional files not copied to the second namespace, wherein the child file has target extended attributes indicating a path relationship to the parent file;

cloning the first namespace to the second namespace including the parent file and child file to generate a cloned parent file and cloned child file in the second namespace;

verifying that each of the parent file and child file are identical to the respective cloned parent file and cloned child file;

finding that the path relationship between the cloned parent file and cloned child file in the second namespace; and amending the found path relationship in target extended attributes of the cloned child file to reference the second namespace for the cloned child file in the second namespace.

12. The method of claim 11 wherein the target extended attributes of the child file comprise a synthetic recipe consisting of metadata specifying how to generate the child file.

13. The method of claim 12 wherein the cloning comprises a namespace fastcopy operation.

14. The method of claim 12 wherein the amending comprises modifying metadata of the target extended attributes of the child file to maintain an original relative file relationship between parent and child files in the second namespace to leverage optimizations provided by the copying step with respect to subsequent replication or differencing operations.

15. A computer-implemented method of maintaining parent-child file relationships when cloning a portion of a first namespace to a second namespace, comprising:

fast copy overwrite (FCOW) copying a parent file to a child file within the first namespace, wherein the child file has target extended attributes indicating a path relationship to the parent file, and the parent file has base extended attributes indicating a path relationship to the child file;

cloning the first namespace to the second namespace including the parent file and child file to generate a cloned parent file and cloned child file in the second namespace;

verifying that each of the parent file and child file are identical to the respective cloned parent file and cloned child file;

finding that the path relationship between the cloned parent file and cloned child file in the second namespace;

first amending the found path relationship in target extended attributes of the cloned parent file to reference the second namespace for the cloned child file in the second namespace; and second amending the path relationship in the parent extended attributes of the cloned parent file to reference the cloned parent file in the second namespace.

16. The method of claim 15 wherein the target extended attributes of the child file consist of metadata specifying how to generate the child file.

17. The method of claim 15 wherein the cloning comprises a namespace fastcopy operation.

18. The method of claim 17 wherein the amending comprises modifying metadata of the target extended attributes of the child file to maintain an original relative file relationship between parent and child files in the second namespace to leverage optimizations provided by the copying step with respect to subsequent replication or differencing operations.

* * * * *